(12) United States Patent
Faubert

(10) Patent No.: US 6,286,890 B1
(45) Date of Patent: Sep. 11, 2001

(54) SLIDING DOOR TRACK STABILIZER

(75) Inventor: Robert J. Faubert, Rochester Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/526,999

(22) Filed: Mar. 16, 2000

(51) Int. Cl.$^7$ .................................. B60J 5/04; E05F 7/04
(52) U.S. Cl. ........................... 296/155; 49/459; 16/86 A
(58) Field of Search ............................ 296/155; 49/409, 49/410, 411, 279, 360, 459; 16/86 R, 86 A

(56) References Cited

U.S. PATENT DOCUMENTS 4,692,960 * 9/1987 Jozefczak ........................... 16/86 A
5,618,080 * 4/1997 Sullivan et al. ..................... 296/155
5,832,668 * 11/1998 Faubert et al. ....................... 49/215
5,934,022 * 8/1999 Faubert .............................. 49/360

* cited by examiner

*Primary Examiner*—D. Glenn Dayoan
*Assistant Examiner*—Patricia Engle
(74) *Attorney, Agent, or Firm*—Mark P. Calcaterra

(57) ABSTRACT

A sliding door system for a motor vehicle. The vehicle has a body portion defining an aperture. The sliding door system includes a door assembly slidably movable along a path from a fully opened position to a fully closed position. A guide track is coupled to the body portion for guiding the door assembly. A guide assembly is coupled to the door assembly. The guide assembly includes a guide roller disposed in the track for guiding the door between the fully open position and the fully closed position. A track stabilizer is coupled to the guide track for opposing movement of the door assembly relative to the vehicle in a generally cross-car direction when the door assembly is closed.

16 Claims, 4 Drawing Sheets

SLIDING DOOR TRACK STABILIZER

BACKGROUND OF THE INVENTION

1. Technical Field

The present invention generally pertains to a sliding door assembly for a motor vehicle. More particularly, the present invention relates to a stabilizer for a sliding door track which opposes lateral movement of the sliding door when in the closed postion.

2. Discussion

In the automotive industry, sliding doors have become standard to provide passenger access to high occupancy vehicles such as minivans. A typical sliding door assembly includes a hinge assembly connecting the sliding door to a track. The track generally extends along the side of the vehicle and can be located in a number of positions. For example, a lower track is often positioned along a lower edge of the vehicle, and curves beneath the passenger compartment at the front end. Similarly, an upper track corresponding in shape is often positioned along an upper edge of the vehicle. The sliding door is generally guided along the tracks by a plurality of guide wheels contacting internal surfaces of the tracks. The ability of vehicle sliding doors to open and close easily and accurately is very important to door operation and customer satisfaction.

A critical parameter affecting this ease and accuracy of door movement is the alignment of the sliding door with the body of the vehicle when transitioning to and from the closed position. For example, movement of the sliding door in the lateral (cross-car) direction during this transition creates additional stress on the passenger door and surrounding parts. Movement of the door in a lateral direction may also result in undesirable noise and vibrations during vehicle travel when the door is closed.

To assist with alignment, it is common to dispose a plurality of sliding door stabilizer halves along the forward facing perimeter of the sliding door. The sliding door stabilizer halves cooperate with a corresponding plurality of body stabilizer halves along the vehicle body. The two sets of halves mate in a male/female fashion when the door is opening and closing. Stabilization takes place at a moment just before the sliding door is closed and just after it is opened.

An improved sliding door lower track stabilizer is disclosed by commonly assigned U.S. Pat. No. 5,934,022, which is hereby incorporated by reference as if fully set forth herein. The disclosed apparatus is coupled to the lower track and limits cross-car movement of a guide wheel. The apparatus improves door alignment during transition to and from a closed position.

While known sets of stabilizer halves and the apparatus disclosed by U.S. Pat. No. 5,934,022 provide significant functional advantages, a need remains in the art for a stabilizer that substantially eliminates noise and vibrations which may result between an upper guide track and associated guide wheel.

SUMMARY OF THE INVENTION

It is a general object of the present invention to provide an apparatus for substantially eliminating noise and vibrations which may otherwise develop between an upper track of a sliding door assembly and a guide wheel.

In one form, the present invention provides a sliding door system for a motor vehicle having a body portion defining an aperture. The sliding door system includes a door assembly slidably movable along a path from a fully opened position to a fully closed position. A guide track is coupled to the body portion for guiding the door assembly. A guide assembly is coupled to the door assembly. The guide assembly includes a guide roller disposed in the guide track for guiding the door between the fully open position and the fully closed position. A track stabilizer is coupled to the guide track for opposing movement of the door assembly relative to the vehicle in a generally cross-car direction when the door assembly is closed.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
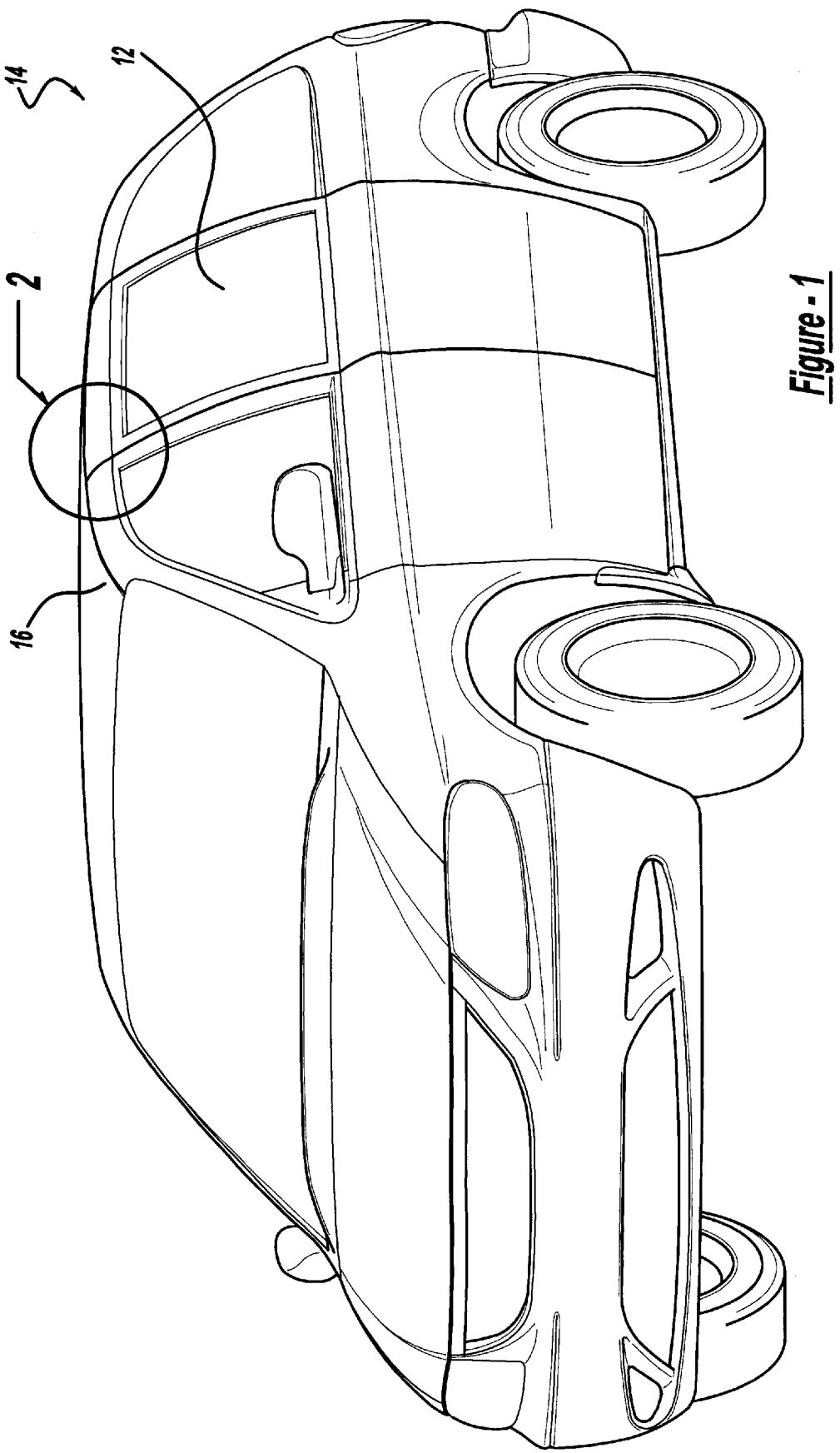
FIG. 1 is a perspective view showing a typical a sliding door assembly mounted on an exemplary motor vehicle.
Figure 2:
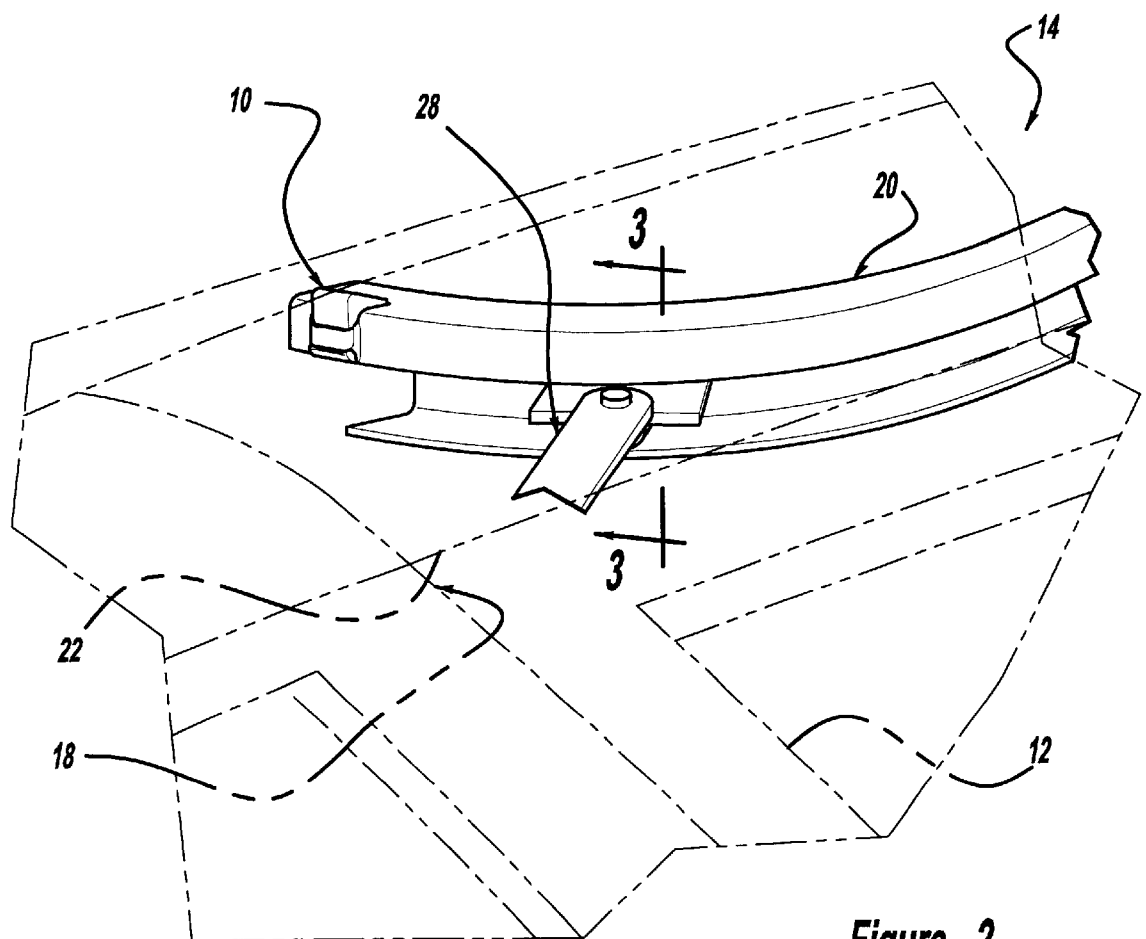
FIG. 2 is an enlarged view of detail internally located within the area identified at circle 2 in FIG. 1, illustrating a upper track stabilizer constructed in accordance with the teachings of a preferred embodiment of the present invention, the stabilizer shown operatively associated with an upper guide track.
Figure 3:
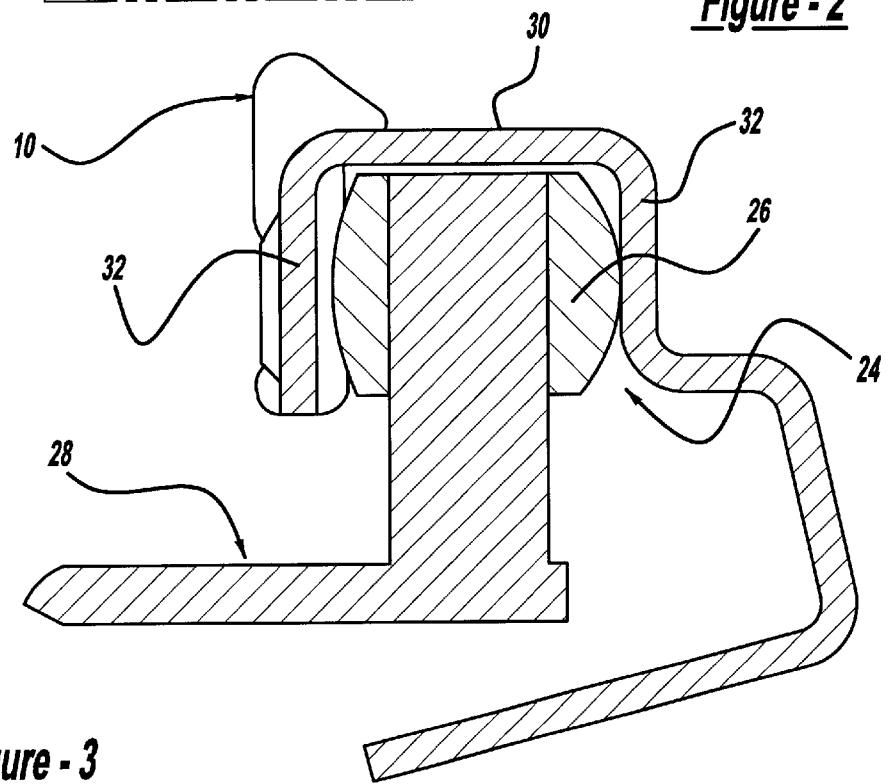
FIG. 3 is a sectional view along lines 3—3 of FIG. 2 showing the preferred embodiment of the present invention.

Referring to FIGS. 1–7, the present invention is specifically directed to a sliding door upper track stabilizer 10 which is incorporated into a sliding door system. The stabilizer 10 is operative for opposing lateral movement of a sliding door 12 of a motor vehicle 14 while the sliding door 12 is in a closed position. The motor vehicle 14 includes a body 16 defining a side opening 18. The sliding door or sliding door assembly 12 is operative in a conventional manner for selectively providing access through the opening 18. Explaining further, in its closed position (as shown in FIGS. 1 and 2), the sliding door 12 prevents access through the opening 18 and in the open position (not particularly shown), the sliding door 12 allows access through the opening 18. It will be understood by those skilled in the art that the particular vehicle 14 shown in the drawings is merely exemplary.

Prior to addressing the construction and operation of the stabilizer 10, a brief understanding of the environment into which it is intended to be incorporated is warranted. As is particularly shown in FIG. 2, a steel upper track or upper guide track 20 is attached to the body 16 of the vehicle 14 adjacent an upper edge 22 of the opening 18. A lower guide track (not shown) having a substantially identical configuration is positioned adjacent a lower edge of the opening 18. One suitable lower guide track is shown and described in commonly assigned U.S. Pat. No. 5,934,022.

The upper guide track 20 defines a channel 24 for receiving a roller or guide wheel 26 of a guide assembly 28. The guide assembly 28 is substantially conventional in construction and functions to interconnect the sliding door 12 to the upper guide track for movement along a predetermined path. In the embodiment illustrated, the path is defined by the shape of the upper track 20 which includes a forward arcuate portion which extends in an inboard direction. for movement along a predetermined path. In the embodiment illustrated, the path is defined by the shape of the upper track 20 which includes a forward arcuate portion which extends in an inboard direction.

The upper guide track 20 includes an upper portion having a generally inverted U-shape with a top side 30 and a pair of laterally spaced apart and downwardly extending sides 32. The downwardly extending sides 32 normally oppose movement of the sliding door 12 in a generally laterally or cross-car direction. This opposition normally occurs both as the door is translated to and from its closed position and during vehicle transit while the sliding door 12 is closed.

When the sliding door 12 is translated between its open and closed positions, a degree of operating clearance is required between the downwardly extending sides 32 and the guide roller 26. In the closed position, the guide wheel 26 is at the forward most end of the upper guide track 20 and operational clearance between the downwardly extending sides 32 and the guide wheel 26 is not required. In fact, normal operating clearance often tends to result in undesirable noise and vibrations. The weight of the sliding door 12 and cabin pressure of the motor vehicle 14 tends to push the sliding 12 outboard when it is in its closed position. The stabilizer 10 of the present invention is configured and positioned to substantially eliminate undesirable noise and vibrations which may be otherwise generated between the guide wheel 26 and the steel upper guide track 20.

Figure 4:
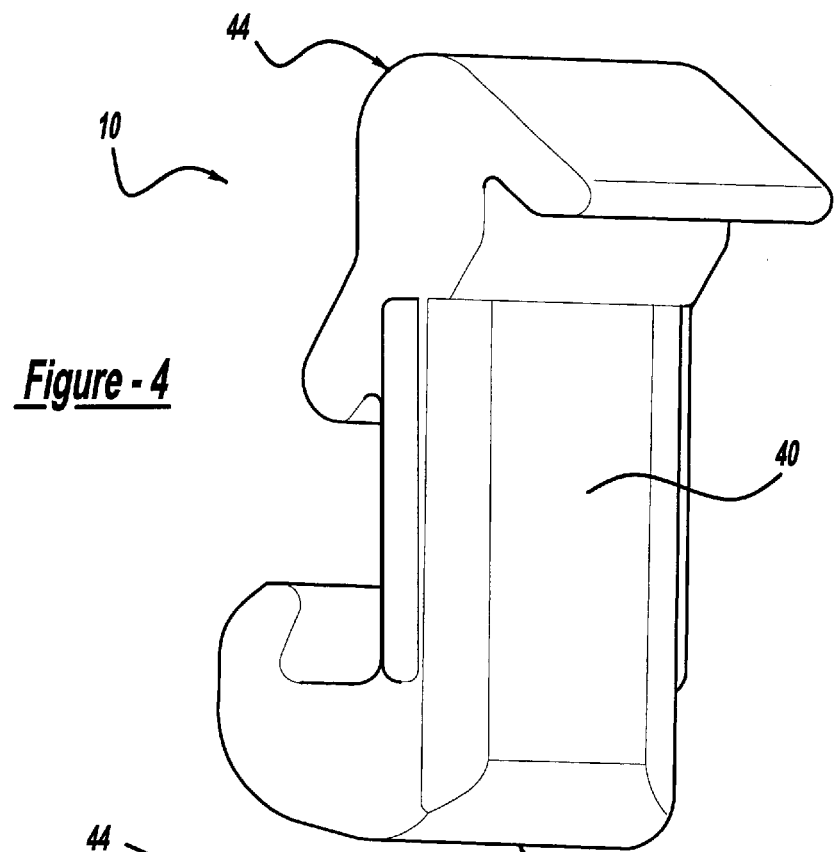
FIG. 4 is a front and side perspective view of the stabilizer of the present invention.
Figure 5:
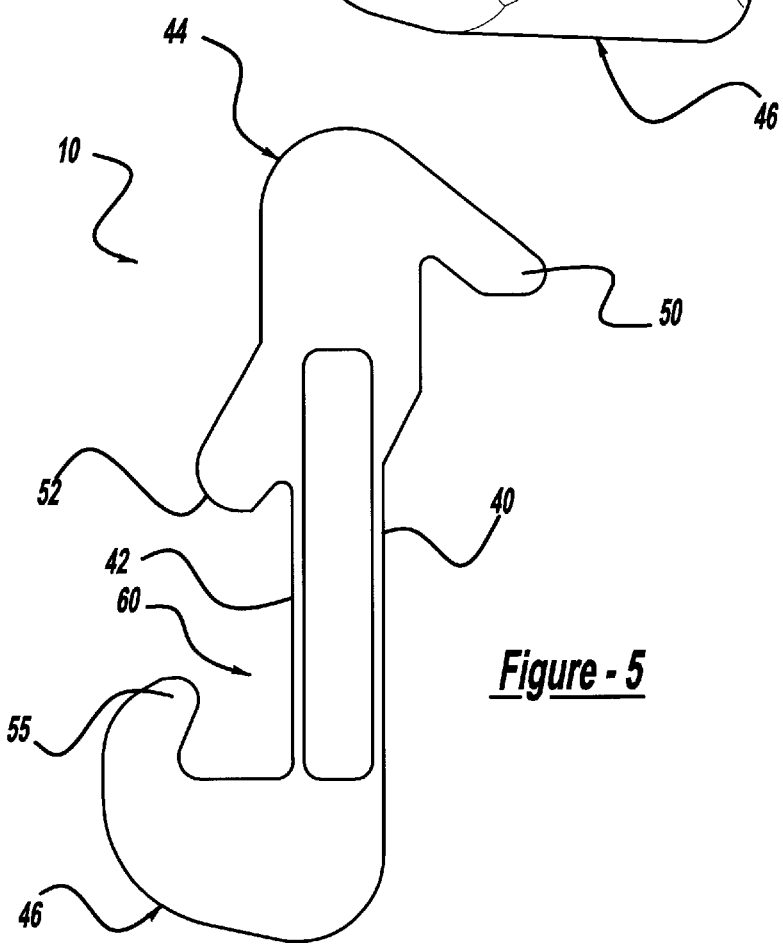
FIG. 5 is a side view of the stabilizer of the present invention.
Figure 6:
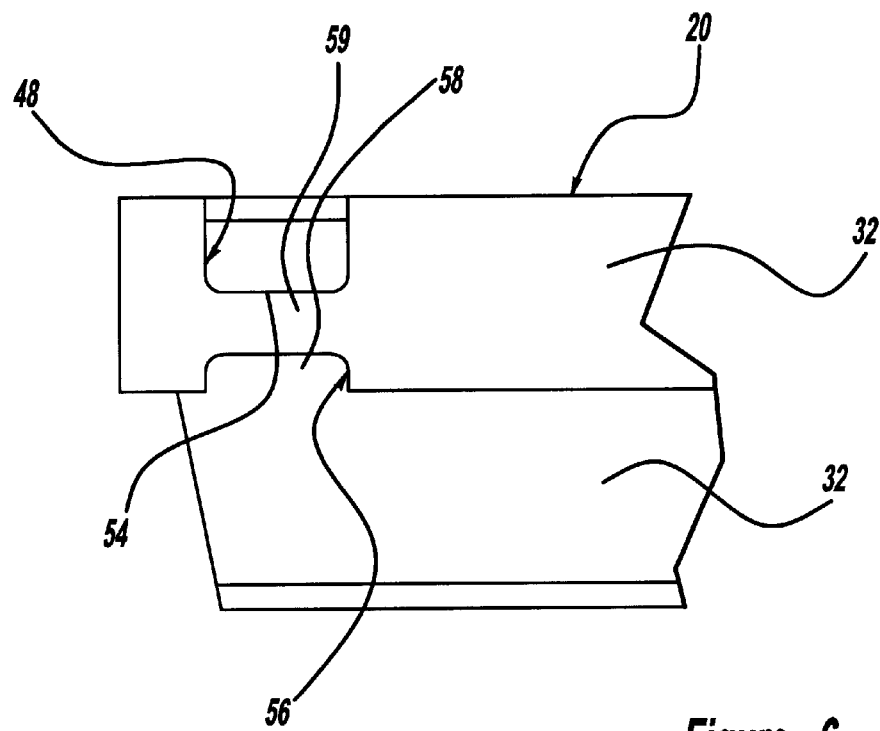
FIG. 6 is a rear view of a portion of the upper track configured to receive the stabilizer of the present invention.
Figure 7:
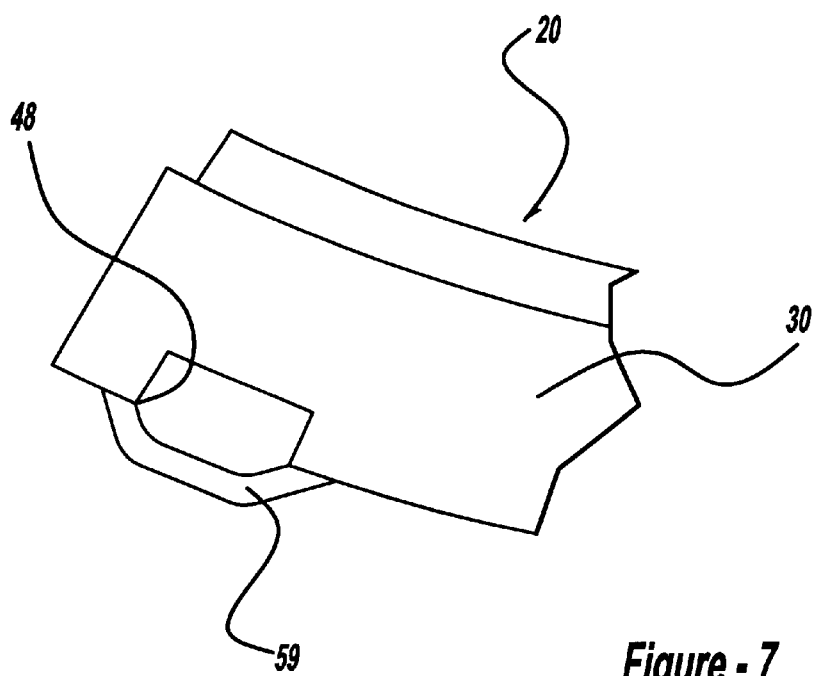
FIG. 7 is a top view of the portion of the upper track of FIG. 6.

As particularly shown in FIGS. 4 and 5, the stabilizer 10 is integrally formed. While various types of materials can be employed, one suitable material for the stabilizer is urethane. As will become apparent below, the construction of the stabilizer 10 is adapted to snap on to the upper guide track 20.

The stabilizer 10 is shown to include a first side 40 or generally inboard facing side and a second or general outboard facing side 42. It is noted that due to the curvature of the forward end of the upper guide track 20, the sides 40 and 42 will not directly be oriented to face inboard and outboard, respectively. The stabilizer 10 further includes an upper end 44 and a lower end 46. The upper end 44 extends through and engages an opening 48 provided in the upper track 20. As shown particularly in FIGS. 5 and 6, the aperture 48 is formed in a portion of one of the downwardly extending sidewalls 32 and a portion of the top side 30. The upper end 44 includes a downwardly angled flange or wing 50 which abuts the upper side 30 adjacent the aperture 48. The upper end 44 further includes a lower flange or wing 52 which engages a lower edge 54 of the aperture 48.

The lower end 46 of the stabilizer 10 includes a wing or flange 55 disposed in a slot 56 defined in the sidewall 32 immediately below the aperture 48. The wing 54 engages a horizontal edge 58 which partially defines the slot 56. In the embodiment illustrated, a narrow web 59 is disposed between the aperture 48 and the slot 56. The web 59 bows outward slightly. The wing 52 and the wing 55 cooperate to define a groove 60 for receiving the web 59. The relatively flexible nature of the material used for unitarily constructing the stabilizer 10 permits the stabilizer 10 to be easily engaged with the upper track 20 in a snap-fit relationship.

In operation, the stabilizer 10 functions to oppose movement of the guide roller 26 in a generally cross-car direction when the sliding door 12 is closed. The guide roller 26 bears directly against the inboard facing side 40 of the stabilizer 10. In this manner, noise and vibration which may otherwise be generated between the guide roller 26 and the steel guide track 20 is eliminated.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. For example, the teachings of the present invention are equally applicable for a lower guide track. Therefore, it is intended that the invention not be limited to the particular embodiment illustrated by the drawings and described in the specification as the best mode presently contemplated for carrying out this invention, but that the invention will include any embodiments following within the description of the appended claims.

What is claimed is:

1. A sliding door system for a vehicle having a body portion defining an aperture, the sliding door system comprising:
   a door assembly slidably movable along a path from a fully open position to a fully closed position;
   a guide track for coupling to the body portion for guiding the door assembly;
   a guide assembly coupled to the door assembly, the guide assembly including a guide roller disposed within the guide track for guiding the door assembly between the fully opened position and the fully closed position; and
   a track stabilizer coupled to the guide track for opposing movement of the door assembly relative to the vehicle in a generally cross-car direction;
   wherein the track stabilizer directly opposes movement of the guide roller in the generally cross-car direction when the sliding door is in the closed position.

2. The sliding door system for a motor vehicle of claim 1, wherein the track stabilizer is coupled to a forward edge of the guide track.

3. The sliding door system for a motor vehicle of claim 1, wherein the track stabilizer engages the guide track in a snap fit.

4. The sliding door system for a motor vehicle of claim 1, wherein the guide track includes a top side and a downwardly extending side at least partially defining a channel for receiving the guide roller, and further wherein the track stabilizer includes a first portion engaging the top side and a second portion engaging the downwardly extending side.

5. The sliding door system for a motor vehicle of claim 4, wherein the guide track defines an aperture formed in a portion of the top side and a portion of the downwardly extending side, the first portion of the track stabilizer extending through the aperture.

6. The sliding door system for a motor vehicle of claim 5, wherein the first portion includes a first wing engaging a horizontal edge of the top side and a second wing engaging a vertical edge of the downwardly extending side.

7. The sliding door system for a motor vehicle of claim 1, wherein the track stabilizer is an upper track stabilizer coupled to an upper guide track.

8. A motor vehicle comprising:

a body portion having a side defining an opening;

a door assembly slidably movable along a path from fully open position to a fully closed position such that access to an interior of the motor vehicle is provided through the opening in the fully opened position and access through the aperture is prevented in the fully closed position;

an upper guide track coupled to the body portion adjacent an upper edge of the opening;

a guide assembly coupled to an upper edge of the door assembly near a front corner, the guide assembly including a guide roller disposed within the upper guide track for guiding the door assembly between the fully opened position and the fully closed position;

an upper track stabilizer coupled to the upper guide track for opposing reducing movement of the door assembly relative to the vehicle in a generally cross-car direction; and wherein the upper track stabilizer directly opposes movement of the guide roller in the cross-car direction when the sliding door assembly is in the closed position.

9. The motor vehicle of claim 8, wherein the upper track stabilizer is coupled to a forward edge of the upper guide track.

10. The motor vehicle of claim 8, wherein the upper track stabilizer engages the upper guide track in a snap fit.

11. The motor vehicle of claim 8, wherein the upper guide track includes a top side and a downwardly extending side at least partially defining a channel for receiving the guide roller, and further wherein the upper track stabilizer includes a first portion engaging the top side and a second portion engaging the downwardly extending side.

12. The motor vehicle of claim 11, wherein the upper guide track defines an aperture formed in a portion of the top side and a portion of the downwardly extending side, the first portion of the upper track stabilizer extending through the aperture.

13. A sliding door system for a vehicle having a body portion defining an aperture, the sliding door system comprising:

a door assembly slidably movable along a path from a fully open position to a fully closed position;

a guide track for coupling to the body portion for guiding the door assembly;

a guide assembly coupled to the door assembly, the guide assembly including a guide roller disposed within the guide track for guiding the door assembly between the fully opened position and the fully closed position; and a track stabilizer coupled to the guide track for opposing movement of the door assembly relative to the vehicle in a generally cross-car direction;

wherein the track stabilizer directly opposes movement of the guide roller in the generally cross-car direction when the sliding door is in the closed position;

wherein the guide track includes a top side, a downwardly extending side at least partially defining a channel for receiving the guide roller, and an aperture formed in a portion of the top side and a portion of the downwardly extending side, and further wherein the track stabilizer includes a first portion engaging the top side and a second portion engaging the downwardly extending side, the first portion of the track stabilizer extending through the aperture.

14. The sliding door system for a motor vehicle of claim 13, wherein the track stabilizer is coupled to a forward edge of the guide track.

15. The sliding door system for a motor vehicle of claim 13, wherein the track stabilizer engages the guide track in a snap fit.

16. The sliding door system for a motor vehicle of claim 13, wherein the first portion includes a first wing engaging a horizontal edge of the top side and a second wing engaging a vertical edge of the downwardly extending side.

\* \* \* \* \*